US009811183B2

(12) United States Patent
Rane et al.

(10) Patent No.: US 9,811,183 B2
(45) Date of Patent: Nov. 7, 2017

(54) DEVICE FOR CURSOR MOVEMENT AND TOUCH INPUT (71) Applicant: Lenovo (Singapore) Pte. Ltd., New Tech Park (SG)

(72) Inventors: Peter Carlson Rane, Cary, NC (US); Cuong Huy Truong, Cary, NC (US); Daniel Jordan Schantz, Raleigh, NC (US); Ali Kathryn Ent, Raleigh, NC (US); Matthew Ian Tucker, Durham, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 160 days.

(21) Appl. No.: 14/979,944

(22) Filed: Dec. 28, 2015

(65) Prior Publication Data

US 2017/0185177 A1    Jun. 29, 2017

(51) Int. Cl.
*G06F 3/0354* (2013.01)
*G06F 3/038* (2013.01)
*G06F 3/0346* (2013.01)

(52) U.S. Cl.
CPC .......... *G06F 3/03547* (2013.01); *G06F 3/038* (2013.01); *G06F 3/0346* (2013.01)

(58) Field of Classification Search
CPC .. G06F 3/033; G06F 3/30346; G06F 3/03547; G06F 3/038
See application file for complete search history.

(56) References Cited

U.S. PATENT DOCUMENTS

| 2007/0013668 | A1* | 1/2007 | Tien | G06F 1/169 345/173 |
| 2008/0266268 | A1* | 10/2008 | Wang | G06F 1/1616 345/173 |
| 2011/0279223 | A1* | 11/2011 | Hatambeiki | G06F 3/0346 340/4.3 |

* cited by examiner

*Primary Examiner* — Larry Sternbane
(74) *Attorney, Agent, or Firm* — John L. Rogitz; John M. Rogitz (57) ABSTRACT In one aspect, a device includes a housing containing at least one electrical component for wireless communication with a computer, a touch sensor coupled to the housing that generates signals responsive to a person touching a surface of the touch sensor, and pointing device circuitry coupled to the housing that provides input to the at least one electrical component.

18 Claims, 10 Drawing Sheets

DEVICE FOR CURSOR MOVEMENT AND TOUCH INPUT

FIELD

The present application relates generally to a device for cursor movement and touch input.

BACKGROUND

As recognized herein, when giving a computerized slide presentation, one must frequently manage two input devices, namely, a mouse to navigate through the computer from which the slide file is sourced, and a separate "clicker" dedicated to operating the projector. This is cumbersome and inconvenient.

SUMMARY

Accordingly, in one aspect a device includes a housing defining a first surface and a second surface, and that contains first circuitry that wirelessly communicates with a computer to move a cursor. The device also includes pointing device circuitry coupled to the housing that provides input to the first circuitry to move the cursor, and a touch sensor coupled to the housing that generates signals responsive to a person touching a surface of the touch sensor. Still further, the device includes an orientation sensor coupled to the housing that provides input to the first circuitry that is useable by the first circuitry to enable processing of input from the pointing device circuitry and to disable processing of input from the touch sensor responsive to the first surface facing upward, and to disable processing of input from the pointing device circuitry and to enable processing of input from the touch sensor responsive to the first surface facing downward.

In another aspect, a method includes providing a housing containing at least one electrical component for wireless communication with a computer to move a screen cursor, providing pointing device circuitry coupled to the housing that provides input to the at least one electrical component, and providing a touch sensor coupled to the housing that generates signals responsive to a person touching a surface of the touch sensor.

In yet another aspect, a device includes a housing containing at least one electrical component for wireless communication with a computer, a touch sensor coupled to the housing that generates signals responsive to a person touching a surface of the touch sensor, and pointing device circuitry coupled to the housing that provides input to the at least one electrical component.

The details of present principles, both as to their structure and operation, can best be understood in reference to the accompanying drawings, in which like reference numerals refer to like parts, and in which:

DETAILED DESCRIPTION

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to he understood that logic divulged, as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk, read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data, on output lines, for presentation, of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
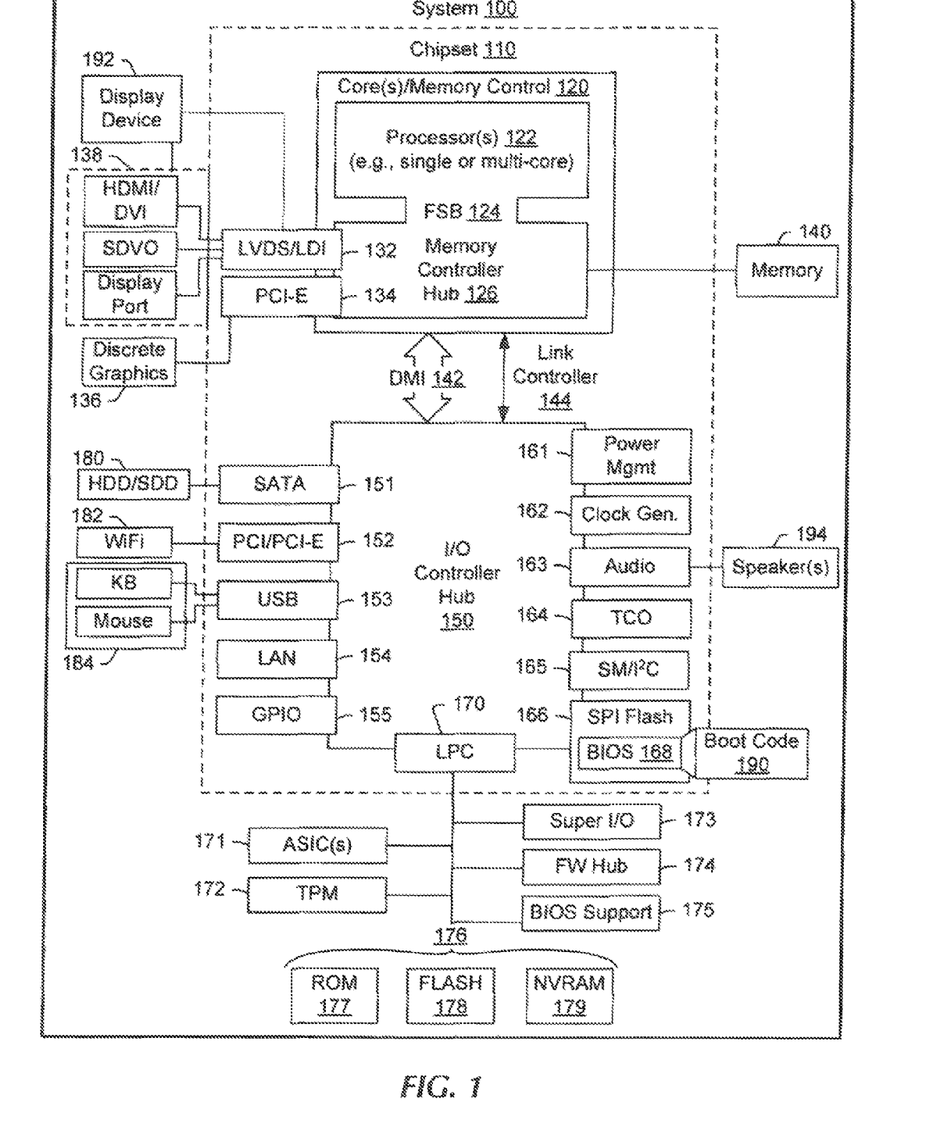
FIG. 1 is a block diagram of an example system in accordance with present principles.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interlace or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
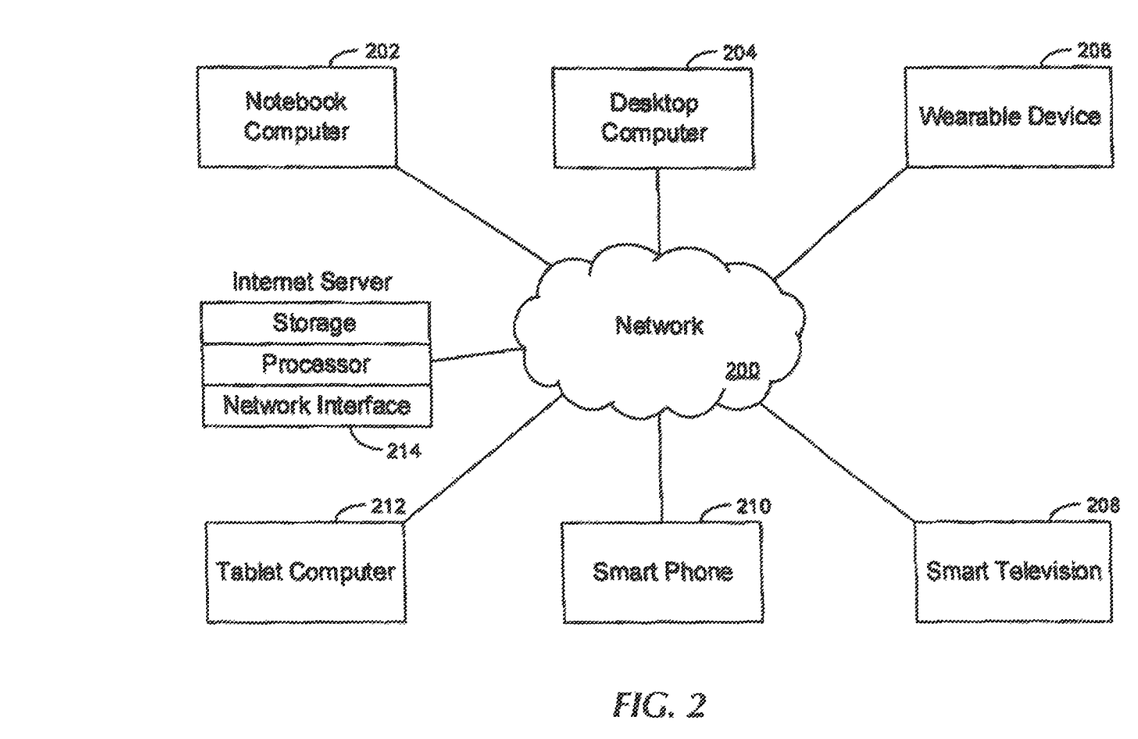
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
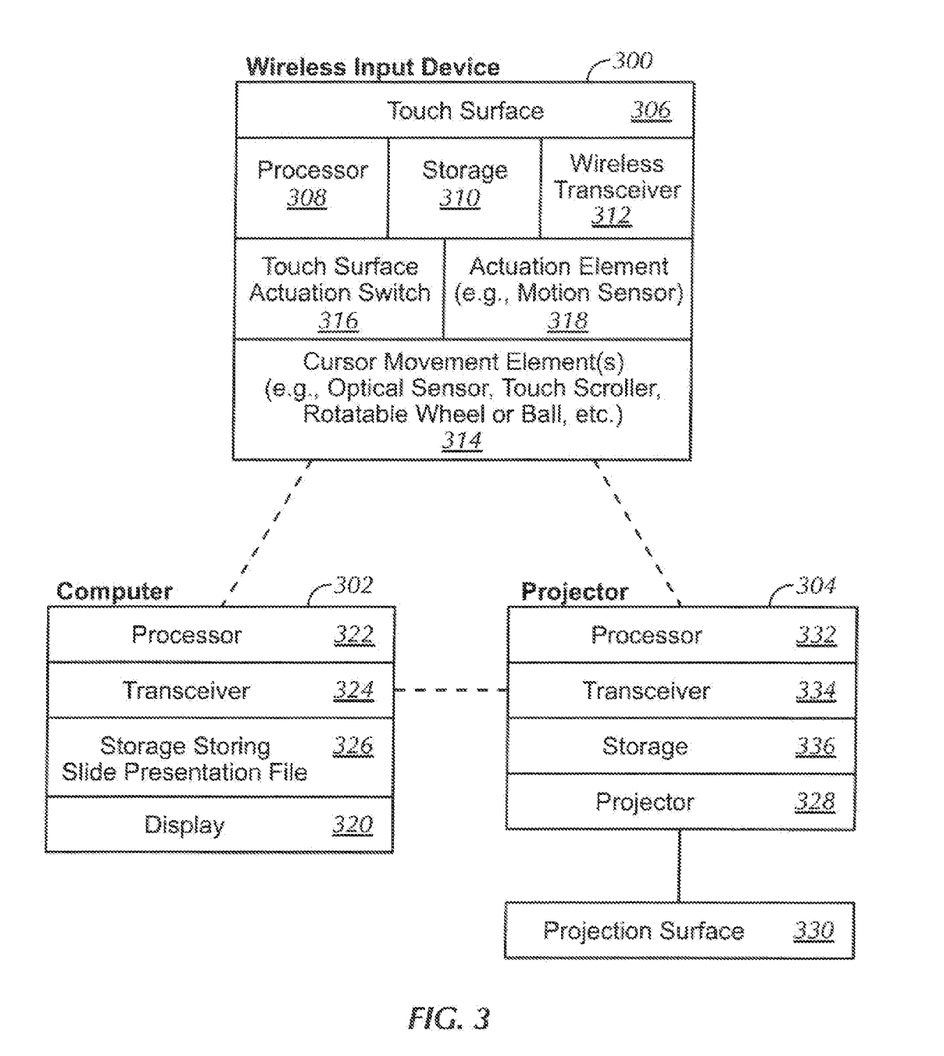
FIG. 3 is a block diagram of devices that may communicate wirelessly with each other in accordance with present principles.

Now referring to FIG. 3, it shows an example wireless input device 300, computer 302, and projector device 304 in wireless communication with each other. The wireless input device 300 includes at least one touch sensor and/or touch sensitive surface 306 coupled to a housing of the device 300 that is configured to generate signals responsive to a person touching a surface of the touch sensitive surface 306. In some embodiments, the touch sensor and/or touch sensitive surface 306 may be established at least in part by a touch-enabled track pad coupled to the device 300.

The wireless input device 300 also includes a processor 308, storage 310 accessible to the processor that may store instructions executable by the processor, and a wireless transceiver 312 accessible to the processor for wireless communication with the computer 302 and projector device 304. Furthermore, note that the touch sensitive surface 306 is also accessible to the processor so that the processor may receive signals therefrom based on the person touching a portion of the touch sensitive surface 306.

The wireless input device 300 may also include pointing device circuitry and/or a cursor movement element 314 coupled to the housing of the device 300 that provides input to the processor 308 to move a cursor presented on a display 320 of the computer 302 and/or a cursor projected by a projector 328 (such as a Pico projector) of the projector device 304 onto a projection surface 330 such as a wall. The pointing device circuitry and/or cursor movement element 314 may include a spherical element that rolls against a surface on which the wireless input device 300 is placed right-side up, as well as sensors that detect the movement of the spherical element to determine a direction of movement of the device 300 and hence a corresponding movement of the cursor. In addition to or in lieu of the foregoing, the pointing device circuitry and/or cursor movement element 314 may include an optical sensor (such as one that is light emitting diode (LED)-based) that detects movement of the device 300 relative to the surface, an infrared (IR) or radio frequency (RF)-based movement detector, a track ball-based movement detector, etc. Still further, the pointing device circuitry and/or cursor movement element 314 may include a touch-sensitive surface along which a person may slide his or her finger to provide input of a scroll command to scroll a page presented on a display (such as the display 320 of the computer 302) and hence move a cursor presented on the display relative to content presented on the display beneath the cursor.

Still in reference to the wireless input device 300, in some embodiments the device 300 may also include a touch surface actuation switch 316 coupled to the housing of the device 300 for selectively switching which input element of the touch sensitive surface 306 and the cursor movement element 314 is operative for generating and/or providing input to the processor 308 and hence which other one of those elements is not concurrently operative. Thus, it is to be understood that the switch 316 is accessible to the processor 308 to provide input to the processor 308, and that in some embodiments the processor 308 may control which of the surface 306 and element 314 is operative responsive to receipt of input from the switch 316.

The wireless input device 300 may also include an actuation element 318 that may include an orientation sensor (which may also he a motion sensor) such as a gyroscope, accelerometer, inertial sensor, etc. The element 318 may be configured to provide input to the processor 308 that is useable by the processor 308 to, for instance, enable generation of input from the cursor movement element 314 and/or processing of input from the element 314, and to correspondingly disable generation of input from the touch sensitive surface 306 and/or processing of input from the surface 306 (such as in embodiments where the surface 306 is established by a touch-enabled track pad), responsive to the device 300 being placed in a first orientation. The element 318 may also provide input to the processor 308 that is useable by the processor 308 to enable generation of input from the surface 306 and/or processing of input from the surface 306, and to correspondingly disable generation of input from the element 314 and/or processing of input from the element 314, responsive to the device 300 being placed in a second orientation different from the first orientation.

Still in reference to FIG. 3, but now describing the computer 302, in addition to the display 320 referenced above, the computer 302 may also include a processor 322 configured to control the display and the projector device 304, and a wireless transceiver 324 accessible to the processor 322 for wireless communication with the device 300 and projector device 304. The computer 302 may also include storage 326 accessible to the processor 322 that may store instructions executable by the processor 322 and that may also store one or more slide presentations and oilier data that may be presentable on the display 320 and projection surface 330 under control of the projector device 304 (where the device 304 may itself be controlled by the computer 302) based on wireless communication between the computer 302 and projector device 304. Furthermore, though not shown for simplicity, it is to be understood that the computer 302 may itself include a projector for projecting images onto a projection surface such as the surface 330 (e.g., based on commands from the device 300).

Now describing the projector device 304, in addition to the projector 328, it may also include a processor 332 and a wireless transceiver accessible to the processor 332 for wireless communication with the device 300 and computer 302. The projector 328 may also include storage 336 accessible to the processor. Furthermore, it is to be understood that the projector 328 is also accessible to the processor 332 to control the projector 328 to present images on a projection surface such as the surface 330 based on commands received from the device 300 and/or computer 302.

Figure 4:
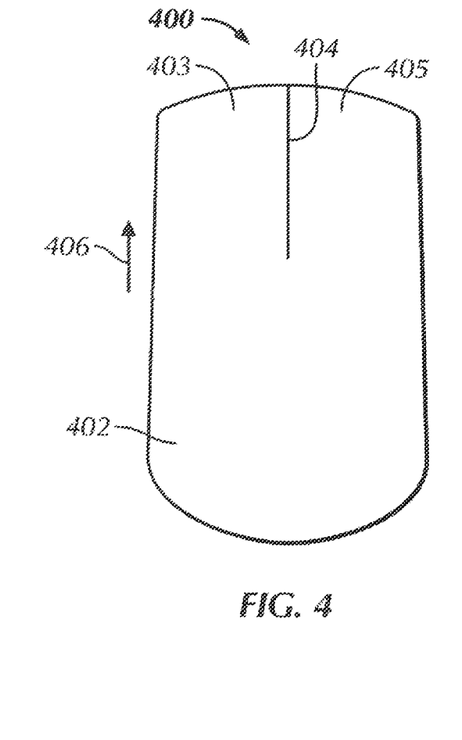
FIGS. 4-9 show various views and illustrations of an example embodiment of a wireless input device in accordance with present principles.
Figure 5:
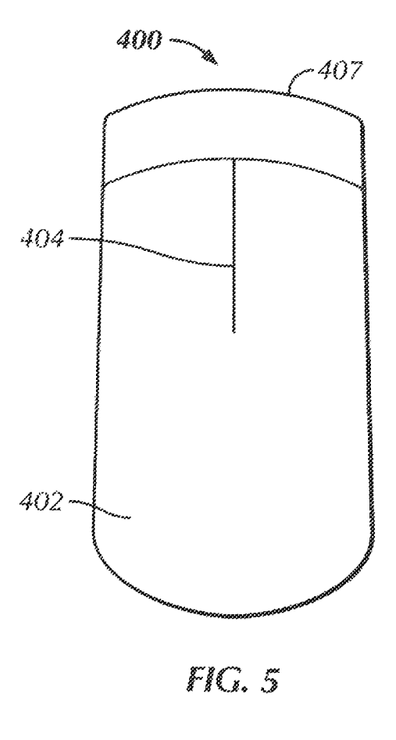
Figure 6:
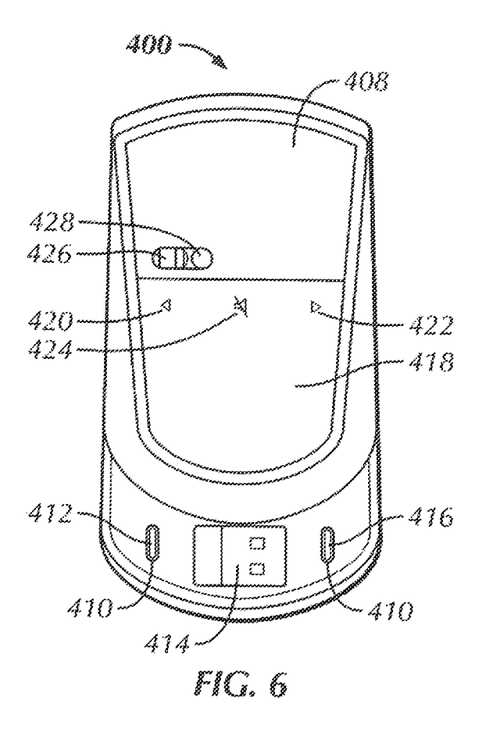
Figure 7:
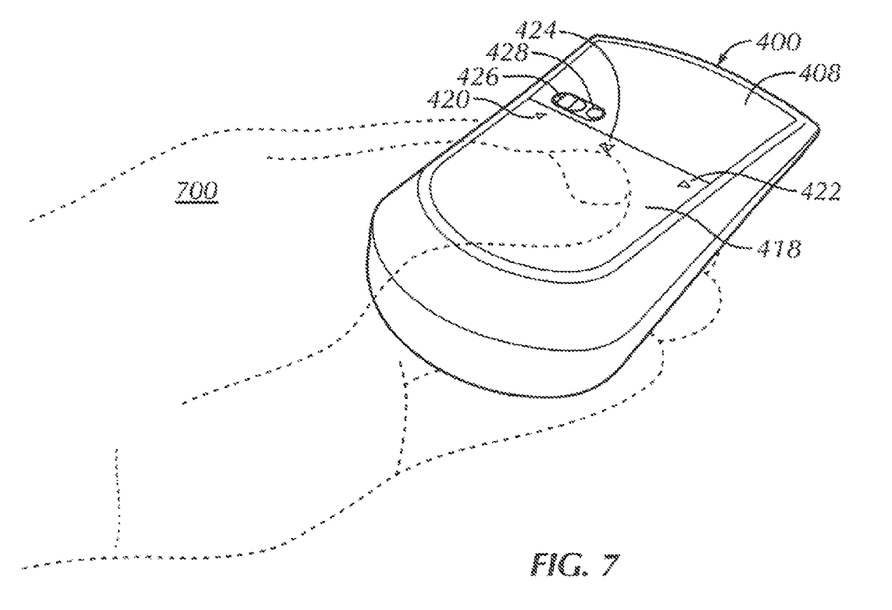

Continuing the detailed description in cross-reference to FIGS. 4-9, they show an example wireless input device 400 that may be similar in function and configuration to the device 300 in some embodiments. FIGS. 4 and 5 show top plan views of the device 400, FIG. 6 shows a bottom plan view of the input device 400, FIG. 7 shows a perspective view of the device 400 being held by a person, and FIGS. 8 and 9 also show perspective views of the device 400.

As may be appreciated from FIGS. 4 and 5, a first surface 402 of a housing of the device 400 is shown that may have coupled thereto a first touch sensor and/or touch sensitive element 404 (referred to below as a "touch sensitive element" for simplicity) to which touch input may be directed to provide input to a processor of the device 400 to in turn transmit a scroll command to be executed by a computer to which the command is transmitted. For example, touch movement along the element 404 in the direction of arrow 406 may he provided to the device 400 to in turn cause the device 404 to transmit a scroll up command, and touch movement along the element 404 in a direction opposite the arrow 406 may be provided to the device 400 to in turn cause the device 404 to transmit a scroll down command.

As may be appreciated from FIGS. 4 and 5, the touch sensitive element 404 may be relatively narrow in length along a longitudinal axis of the device 400 (e.g., one that is parallel to the direction indicated by the arrow 406). The touch sensitive element 404 may also be disposed toward one segment or end of the device 400 defined by the longitudinal axis as shown in some embodiments.

In addition to the foregoing, the first surface 402 may also comprise one or more buttons 403, 405, such as one on either side of the element 404 and juxtaposed adjacent to the element 404. The buttons may be flush with the surface 402 but nonetheless selectable (e.g., depressible and/or touchable) to provide a selection command, such as a left-click command or a right-click command.

Distinguishing FIG. 4 from FIG. 5, the device 400 as shown in FIG. 4 is understood to be in a contracted configuration while the device 400 as shown in FIG. 5 is understood to be in an extended configuration. These configurations are established by a position of the first surface 402 (and/or device components coupled thereto) relative to another portion 407 of the device 400 that is slidably engaged with the surface 402 (and/or device components coupled thereto) for sliding back and forth of the surface 402 relative to the portion 407 in a direction defined by the longitudinal axis described above.

Accordingly, FIG. 6 shows the extended configuration of the device 400 from an opposite perspective than the device 400 was shown in FIG. 5 to thus show a second surface 408 of the housing of the device 400 that may at least substantially oppose the surface 402 (e.g., oppose in a plane within a threshold number of degrees (e.g., ten) of parallel to a plane established by the surface 402). Device components 410 coupled to and/or removably engaged with the first surface 402 are exposed in the extended configuration as shown in FIG. 6, but are understood to be unexposed and hence covered by the surface 408 while the device 400 is in the contracted configuration. Examples of such device components 410 include a connector 412 for engagement with a battery charger to charge a battery in the device 400 that powers components of the device 400, and a wireless universal serial bus (USB) transceiver 414 that may be removed from the device 400 and engaged with a computer's USB port to facilitate wireless communication between a wireless transceiver on the device 400 and the computer via the transceiver 414 when inserted into the computer's USB port. Another example component is an on/off switch for turning the device 400 on and off for control of a cursor presented on a display of a computer in communication with the device 400.

As may be appreciated from FIGS. 6-9, the second surface 402 may also hear and/or have coupled thereto a touch sensitive input device 418 that generates signals responsive to a person 700 touching an external surface of it (such as the surface shown in these figures) while holding the device 400 in their hand as illustrated in FIG. 7. The touch sensitive input device 418 may he similar to the surface 306 described above and may be established as least in part by a track pad in some embodiments. Furthermore, it is to be understood that the input device 418 may also have at least one, and optionally two, depressible portions thereof that are depressible from the surface 408 toward the surface 402 to provide a selection command, such as a left-click command or a right-click command.

Additionally, in some embodiments one or more selectors 420, 422, and 424 may be disposed on and/or coupled to the second surface 408. The selectors 420-424 may be established as a portion of the touch sensitive input device 418 or may be separate from the touch sensitive input device 418. Furthermore, the selectors 420-424 may be touch-sensitive to receive input (e.g., selection) of the respective selector based on a person touching (but not depressing) the respective selector, and/or may be depressible buttons that when depressed generate input. In some embodiments, the selector 420 may be a back selector and the selector 422 may be a forward selector that are respectively selectable to navigate backward and forward through content, e.g., in an Internet browser or a slide show presentation being presented using one or more devices in communication with the device 400, such as the computer 302 and projector device 304 described above. Furthermore, the selector 424 may be a mute selector that is selectable to mute audio being presented by a device in communication with the device 400.

Still in reference to FIGS. 6-9, the second surface 408 may also bear and/or have coupled thereto pointing device circuitry and/or a cursor movement element 426 (referred to below as a "cursor movement element" for simplicity) that provides input to circuitry of the device 400 that is useful to move a cursor presented on a display under control of another device such as the computer 302 (e.g., based on communication from the device 400 to the other device of directional input determined from signals from the element 426). In some embodiments, the element 426 may be similar to the element 314 described above.

Furthermore, the cursor movement element 426 may be slidably obstructed and unobstructed from external to the device 400 based on movement of a slider 428 that is slidably engaged with the housing of the device 400. The slider 428 may be one or both of mechanically moveable by a user or electronically moveable under control of circuitry of the device 400 (e.g., electronically moveable to obstruct the element 426 responsive to user input powering off the device 400, and electrically moveable to unobstruct the element 426 responsive to user input powering on the device 400).

Figure 8:
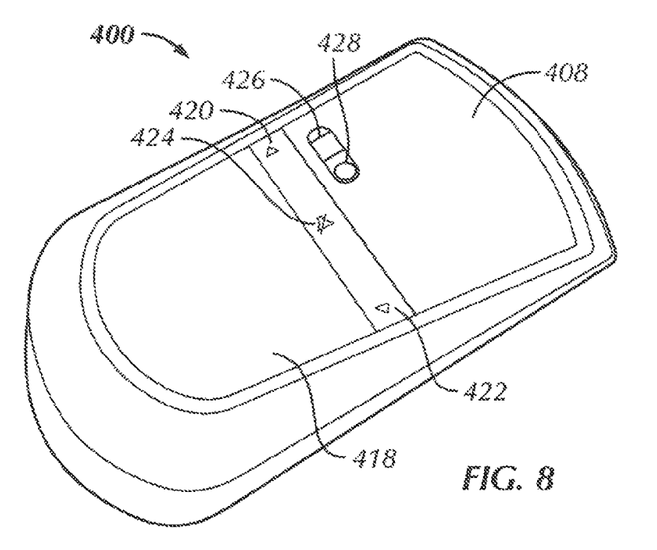
Figure 9:
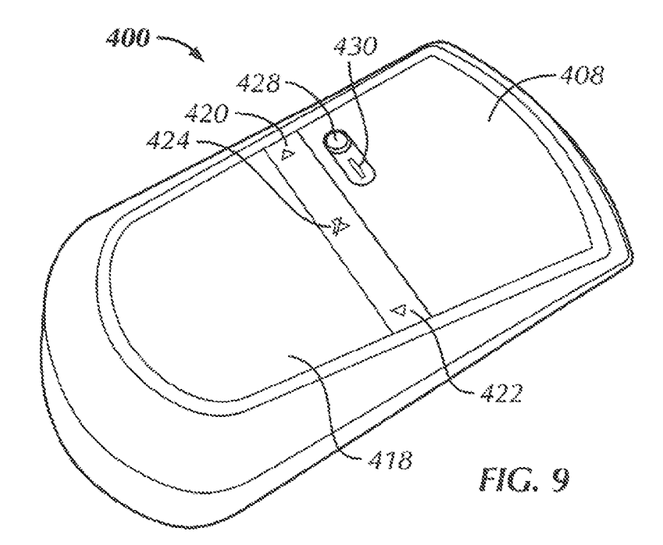

Moreover, as may be appreciated from FIGS. 6-9, the slider may have at least one protrusion which a user may exert force against to slide the slider 428 back and forth between an obstructed configuration as shown in FIG. 8 and an unobstructed configuration as shown in FIG. 9. While the slider 428 is in the unobstructed configuration shown in FIG. 8, the cursor movement element 426 is understood to be able to detect movement of the device 400 against an object on which the second surface 408 and hence device 400 is positioned and moved, such as a desk, at least because the cursor movement element 426 is able to detect the object and movement of the device 400 relative to the object unobstructed by the slider 428.

However, while the slider 428 is in the obstructed configuration shown in FIG. 9, the cursor movement element 426 is understood to be unable to detect movement of the device 400 against the object on which the device 400 is positioned and moved at least because a wall of the slider 428 is juxtaposed between the element 426 and object to thus obstruct the element 426 from being able to detect movement of the device 400 relative to the object. Moreover, in some embodiments a wall of the slider 428 facing away from the device 400 when the slider 428 is slid to the obstructed configuration may have an indicator 430 disposed thereon (such as a red line or other marking) to indicate that the slider has been positional in the obstructed configuration and hence the device 400 cannot to detect movement of it against an object via the obstructed cursor movement element 426.

Figure 10:
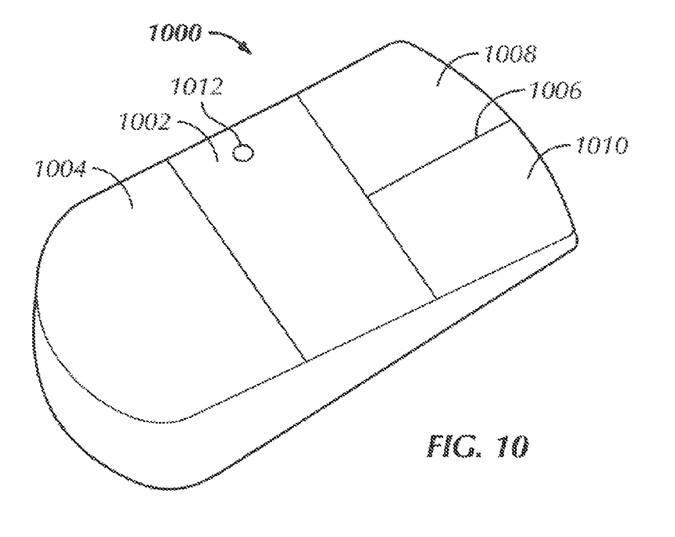
FIG. 10 shows a perspective view of another example embodiment of a wireless input device in accordance with present principles.

Now in reference to FIG. 10, another embodiment of a wireless input device in accordance with present principles is shown. FIG. 10 shows a perspective view of a wireless input device 1000 that may be similar in at least some respects to the device 300 described above. The device 1000 includes a first surface 1002 of a housing of the device 1000 that may have disposed thereon and/or coupled thereto a first touch sensor and/or touch sensitive input device 1004 that may be similar to the touch sensitive input device 418 described above. Thus, in some embodiments the device 1004 may be a touch-enabled pad.

The first surface 1002 may also have disposed thereon and/or coupled thereto a second touch sensor and/or touch sensitive input device 1006 that may be similar to the touch sensitive element 404 described above. Thus, it is to be understood that touch input may be directed to the device 1006 to provide input to a processor of the device 1000 to in turn transmit a scroll command to he executed by a computer to which the command is transmitted.

In addition to the foregoing, the first surface 1002 may also comprise one or more buttons, such as buttons 1008, 1010 on respective sides of a surface of the device 1006. The buttons 1008, 1010 may be flush with the surface 1002 but nonetheless selectable (e.g., depressible and/or touchable) to provide a selection command, such as a left-click command using button 1008 or a right-click command using button 1010.

It is to also be understood in reference to FIG. 10 that the device 1000 may include pointing device circuitry and/or a cursor movement element in accordance with present principles (e.g., one similar to the element 314) on a second surface of the device 1000 opposite the first surface 1002 and hence understood to he facing down relative to the perspective view shown in FIG. 10 and thus not shown in FIG. 10.

Still in reference to FIG. 10, in some embodiments the device 1000 may include, on and/or coupled to the surface 1002, an actuation element 1012 (such as a switch that may be similar to the switch 316 in some embodiments) for selectively switching which input element of the first touch sensitive input device 1004 and the cursor movement element described in the paragraph above is operative for generating and/or providing input to a processor of the device 1000 and hence which of those elements is not concurrently operative. Thus, it is to be understood that the switch 1012 is accessible to the processor of the device 1000 to provide input to this processor, and that in some embodiments this processor may control which of the device 1004 and cursor movement element is operative responsive to receipt of input from the switch 1012 generated in response to user manipulation of the switch 1012.

Furthermore, in some embodiments the switch 1012 may be transitioned between more than two positions, such that, for example, the switch 1012 may be moved or actuated to selectively switch which input element of the first touch sensitive input device 1004, the cursor movement element, the device 1006, and/or buttons 1008, 1010 is to be operative for generating and/or providing input to the processor of the device 1000 in accordance with present principles.

It may now be appreciated based on the foregoing description of FIG. 10 that in some examples, a touch sensor and/or touch sensitive input device in accordance with present principles (such as a touch-enabled track pad) may be oriented on one surface of a wireless input device that is opposite another surface of the wireless input device at which a cursor movement element is oriented.

Figure 11:
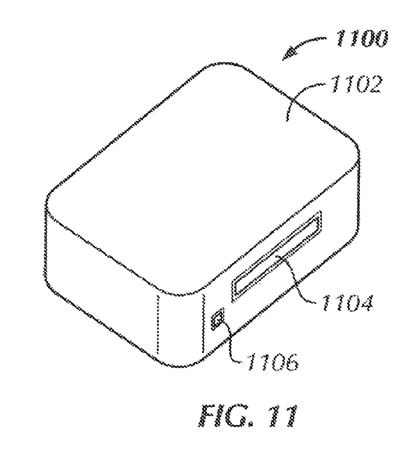
FIGS. 11 and 12 show perspective views of yet another example embodiment of a wireless input device in accordance with present principles.
Figure 12:
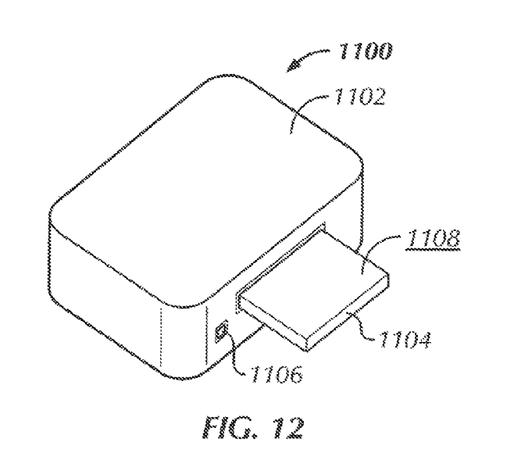

Moving on in the detailed description, reference is now made to FIGS. 11 and 12, which show another embodiment of a wireless input device in accordance with present principles is shown. FIGS. 11 and 12 both show perspective views of a wireless input device 1100 that may be similar to the device 300 described above. The device 1100 includes a first surface 1102 of a housing of the device 1100 that may face upward relative to an object on which the device 1100 is placed when the device 1100 is placed upright on the object so that a cursor movement element on a bottom-facing surface of the device 1100 at least substantially opposite to the surface 1102 may detect movement of the device 1100 along the surface in accordance with present principles.

Furthermore, though not shown for clarity, it is to be understood that in at least some embodiments, the surface 1102 may also have disposed thereon and/or coupled thereto a touch sensor and/or touch sensitive input device that may be similar to the touch sensitive clement 404 described above. Though also not shown for clarity, the surface 1102 may also bear one or more buttons similar to the buttons 1008, 1010 described above. The device 1100 may also include, on the surface 1102 or coupled to another surface of the housing, an actuation element that may be similar to the element 1012.

In contrast to some of the other embodiments discussed herein, the embodiment shown in FIGS. 11 and 12 includes a touch sensor and/or touch sensitive input element 1104 that may be similar to the touch sensitive surface 306 described above (e.g., touch sensitive on at least a portion thereof, such as on side 1108, and optionally touch sensitive on plural sides thereof) but that is slidably engaged with the housing of the device 1100 between a recessed configuration as shown in FIG. 11 and an extended configuration as shown in FIG. 12, To transition the element 1104 from the recessed configuration shown in FIG. 11 to the extended eon figuration shown in FIG. 12, a switch and/or button 1106 on the device 1100 may be selected to cause the element 1104 to slide at least partially out of the housing of the device 1100 into the extended configuration under bias of a spring in the device 1100, and/or a force may be exerted on an exposed surface of the element 1104 inward toward a center of the device 1100 from the element 1104 while in the recessed configuration to unlock a spring in the device 1100 to push the element 1104 out of the device 1100 into the extended configuration.

Conversely, to transition the element 1104 from the extended configuration shown in FIG. 12 to the recessed configuration shown in FIG. 11, a person may exert a force on the element 1104 to slide it toward and into the device 1100 (e.g., into a bay for the element 1104 internal to the device 1100) from the extended configuration and to the recessed configuration to secure the element 1104 in the recessed configuration.

Still in reference to FIGS. 11 and 12, note that although not shown for clarity, the recessed configuration of the device 1100 may he detected by an actuation element such as an internal contact and/or switch coupled to and inside the device 1100 (e.g., inside a bay housing the element 1104 in the recessed configuration). This actuation element may provide input to a processor of the device 1100 to enable input from the touch sensitive input element 1104 (e.g., to be generated and/or processed) responsive to the touch input element being transitioned to the extended configuration and to disable input from the touch sensitive input element 1104 (e.g., from being generated and/or processed) responsive to the touch input element being transitioned to the recessed configuration.

Figure 13:
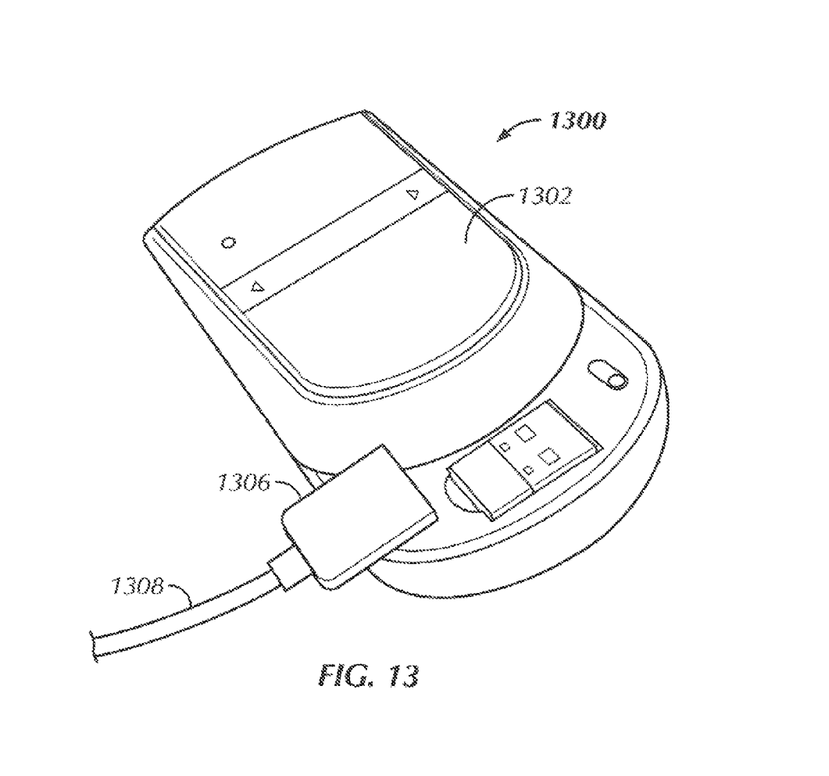
FIGS. 13-15 show various views of an example embodiment of a wireless input device in accordance with present principles.
Figure 14:
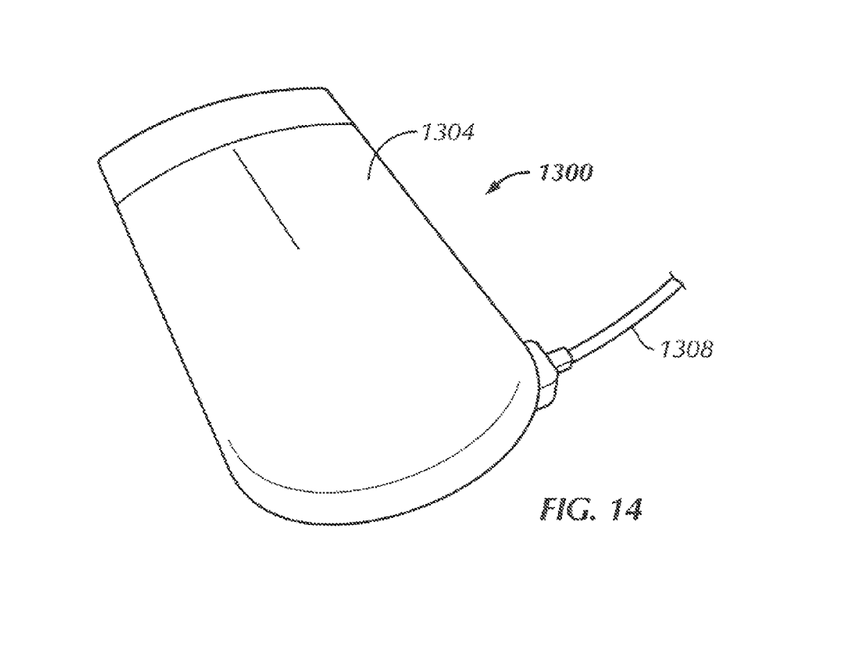
Figure 15:
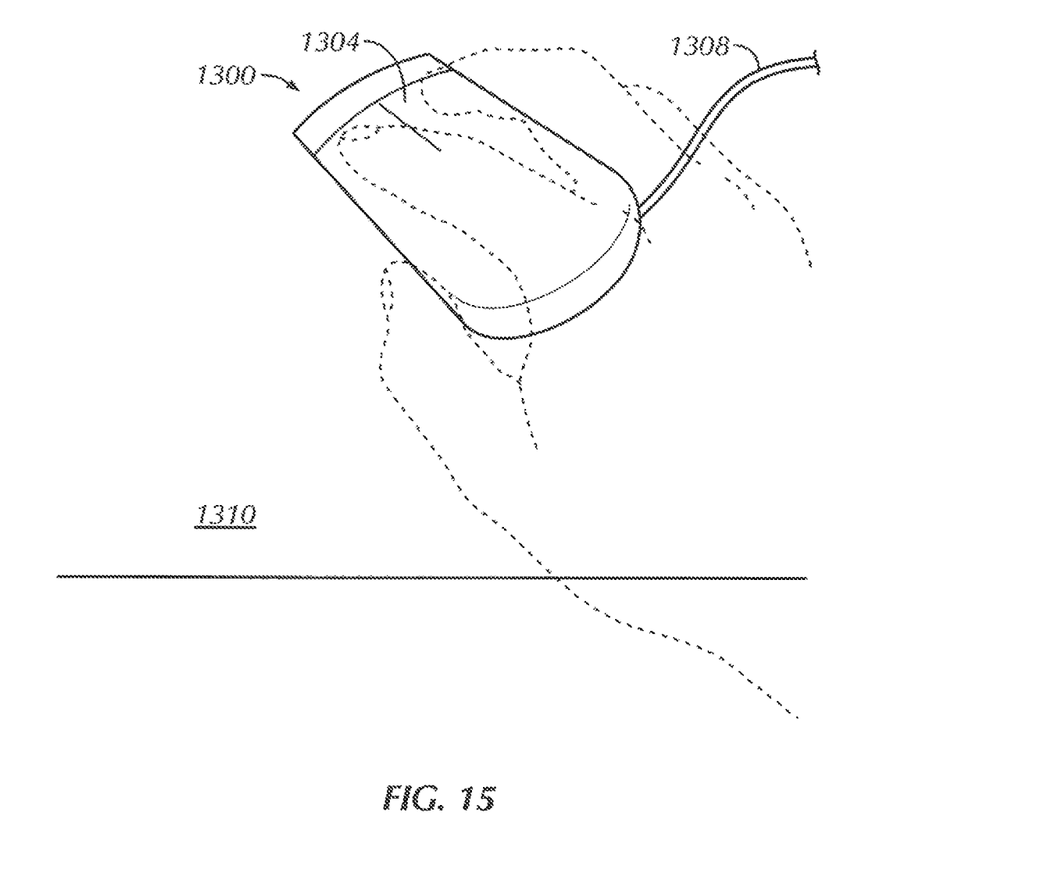

Now in cross-reference to FIGS. 13-15, an example wireless input device 1300 is shown. The input device 1300 may be similar in at least some respects to the device 400 shown in FIG. 4, particularly in the respect that it may have both extended and contracted configurations and a connector 1306 (that may be similar to the connector 412) for engagement with a wire/cord 1308 of a battery charger as shown in FIG. 13 to charge a battery in the device 1300 to power components of the device 1300.

Thus, FIG. 13 shows in a perspective view the device 1300 in an extended configuration and shows one surface 1302 of a housing of the device 1300 (that may be similar to the surface 408 described above) opposed to another surface 1304 of the housing of the device 1300 (that may be similar to the surface 402 described above), with a battery of the device 1300 understood to be charging via the connection to the cord 1308.

FIG. 14 shows the device 1300 from another perspective while the cord 1308 is charging the battery of the device 1300, and FIG. 15 shows a user moving the device 1300 against an object 1310 such as a desk to control a screen cursor presented on a display in accordance with present principles. Thus, it is to be understood that elements of the device 1300 may be used, controlled, and/or have input directed thereto and processed in accordance with present principles even while the device is charging.

Figure 16:
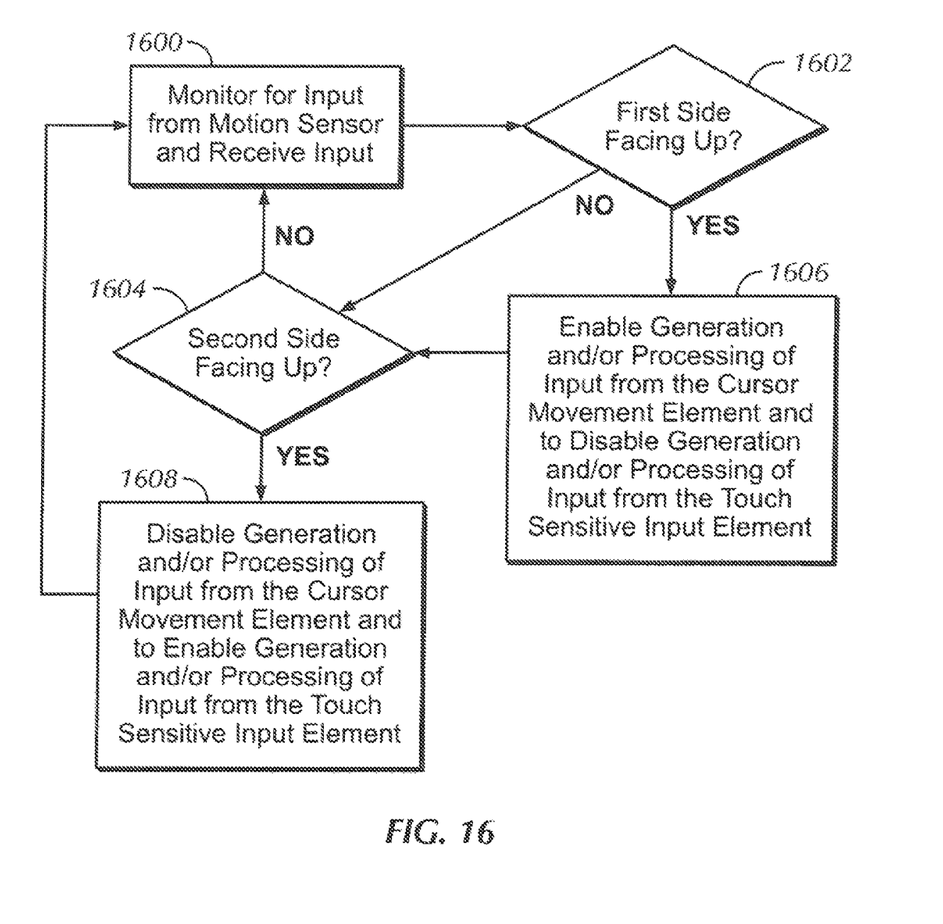
FIG. 16 is a flow chart of an example algorithm in accordance with present principles.

Now describing FIG. 16, it shows example logic that may be executed by a wireless input device such as the device 300 in accordance with present principles (referred to when describing FIG. 16 as the "present device"). Thus, it is to be understood that the present device may store in its storage a driver, software and/or firmware for executing the logic discussed herein.

Beginning at block 1600, the logic of FIG. 16 monitors for input from an orientation and/or motion sensor on the present device. Responsive to input being received from the orientation and/or motion sensor at block 1600, the logic proceeds to decision diamond 1602. At diamond 1602, the logic determines whether input from the orientation and/or motion sensor is indicative of a first side of the present device facing upward.

A negative determination at diamond 1602 causes the logic to proceed to decision diamond 1604, which will be described shortly. However, first note that an affirmative determination at diamond 1602 instead causes the logic to proceed to block 1606. At block 1606 responsive to the affirmative determination at diamond 1602, the logic enables generation and/or processing of input from pointing device circuitry and/or a cursor movement element on the present device and disables generation and/or processing of input from a touch sensor and/or touch sensitive input element on the present device.

The logic then moves from block 1606 to diamond 1604, which may also be arrived at responsive to a negative determination at diamond 1602 as described above. At diamond 1604, the logic determines whether input from the orientation and/or motion sensor is indicative of a second side of the present device different from the first side (e.g., opposing the first side) facing upward (and hence, in some embodiments, whether input from the orientation and/or motion sensor is indicative of the first side facing downward toward earth).

A negative determination at diamond 1604 causes the logic to proceed back to block 1600 and proceed therefrom.

However, an affirmative determination at diamond 1604 instead causes the logic to proceed to block 1608. At block 1608 responsive to the affirmative determination at diamond 1604, the logic disables generation and/or processing of input from the cursor movement element and. enables generation and/or processing of input from the touch sensitive input element.

It may now be appreciated based on the foregoing detailed description that present principles provide for a wireless device that may house multiple input devices, including at least one input device to control a cursor presented on a display of a computer, and at least one input device to navigate through slides of a presentation being projected onto a surface via a projector under control of a computer.

While the particular DEVICE FOR CURSOR MOVEMENT AND TOUCH INPUT is herein shown and described in detail, it is to he understood that the subject matter which is encompassed by the present application is limited only by the claims.

What is claimed is:

1. A device, comprising:
   a housing defining a first surface and a second surface, the housing containing first circuitry that wirelessly communicates with a computer to move a cursor;
   pointing device circuitry coupled to the housing that provides input to the first circuitry to move the cursor;
   a first touch sensor coupled to the housing that generates signals responsive to a person touching a surface of the first touch sensor, the first touch sensor comprising a touch-enabled pad; and
   an orientation sensor coupled to the housing that provides input to the first circuitry that is useable by the first circuitry to enable processing of input from the pointing device circuitry and to disable processing of input from the first touch sensor responsive to the first surface facing upward, and to disable processing of input from the pointing device circuitry and to enable processing of input from the first touch sensor responsive to the first surface facing downward;
   wherein the device comprises a second touch sensor coupled to the housing that is manipulable to provide input to the first circuitry to issue a scroll command.

2. The device of claim 1, wherein the first touch sensor is oriented on the first surface of the housing and the pointing device circuitry is oriented on the second surface of the housing.

3. The device of claim 1, comprising a switch coupled to the housing and manipulable to enable processing of input from the first touch sensor.

4. The device of claim 1, wherein the second surface is opposed to the first surface.

5. The device of claim 1, comprising a slider coupled to the housing that is moveably engaged with the housing, the slider slidably obstructing and unobstructing the pointing device circuitry.

6. A method, comprising:
   providing a housing containing at least one electrical component for wireless communication with a computer to move a screen cursor;
   providing pointing device circuitry coupled to the housing that provides input to the at least one electrical component;
   providing a touch sensor coupled to the housing that generates signals responsive to a person touching a surface of the touch sensor; and
   providing a switch coupled to the housing that is manipulable to enable processing at least of input from the touch sensor.

7. The method of claim 6, comprising providing an actuation element coupled to the housing for selectively switching an operative input element between the touch sensor and the pointing device circuitry.

8. The method of claim 7, wherein the actuation element comprises an orientation sensor that provides input to the at least one electrical component that is useable by the at least one electrical component to enable generation of input from the pointing device circuitry and to disable generation of input from the touch sensor responsive to a first orientation of the housing, and to disable generation of input from the pointing device circuitry and to enable generation of input from the touch sensor responsive to a second orientation of the housing.

9. The method of claim 8, wherein the housing defines a first surface and a second surface opposed to the first surface, the first orientation being established responsive to the first surface facing upward, the touch sensor being oriented on the second surface opposite the first surface.

10. The method of claim 8, wherein the housing defines a first surface and a second surface opposed to the first surface, the first orientation being established responsive to the first surface facing upward, the touch sensor being oriented on the first surface.

11. The method of claim 6, wherein the touch sensor is slidably engaged with the housing between a recessed configuration and an extended configuration.

12. The method of claim 11, comprising providing an actuation element coupled to the housing for enabling input from the touch sensor responsive to the touch sensor being transitioned to the extended configuration and disabling input from the touch sensor responsive to the touch sensor being transitioned to the recessed configuration.

13. A device, comprising:
   a housing containing at least one electrical component for wireless communication with a computer;
   a touch sensor coupled to the housing that generates signals responsive to a person touching a surface of the touch sensor;
   pointing device circuitry coupled to the housing that provides input to the at least one electrical component; and
   a switch coupled to the housing that is manipulable to enable processing at least of input from the touch sensor.

14. The device of claim 13, comprising an actuation element coupled to the housing for selectively switching input between the touch sensor and the pointing device circuitry.

15. The device of claim 14, wherein the actuation element comprises an orientation sensor that provides input to the at least one electrical component that is useable by the at least one electrical component to enable generation of input from the pointing device circuitry and disable generation of input from the touch sensor responsive to the housing being placed in a first orientation, and to disable generation of input from the pointing device circuitry and enable generation of input from the touch sensor responsive to the housing being placed a second orientation.

16. The device of claim 15, wherein the housing defines a first surface and a second surface at least substantially opposed to the first surface, the first orientation being established based on the first surface facing upward, the touch sensor being oriented on the second surface opposite the first surface.

17. The device of claim 15, wherein the housing defines a first surface and a second surface at least substantially opposed to the first surface, the first orientation being established based on the first surface facing upward, the touch sensor being oriented on the first surface.

18. The device of claim 13, comprising an actuation element coupled to the housing, wherein the touch sensor is slidably engaged with the housing between a recessed configuration and an extended configuration, and wherein the actuation element is manipulable to enable input from the touch sensor responsive to the touch sensor being slid to the extended configuration and to disable input from the touch sensor responsive to the touch sensor being slid to the recessed configuration.

\* \* \* \* \*